United States Patent [19]

Kawai et al.

[11] Patent Number: 4,806,724
[45] Date of Patent: Feb. 21, 1989

[54] LASER BEAM MACHINING DEVICE

[75] Inventors: Yoshito Kawai; Akira Kishida, both of Chiba; Shiroh Yokoama, Saitama; Ichiku Yokoyama, Saitama; Goudai Yokoyama, Saitama, all of Japan

[73] Assignees: Kawasaki Steel Corp., Hyogo; Miyama & Co., Ltd., Saitama, both of Japan

[21] Appl. No.: 84,283

[22] Filed: Aug. 11, 1987

[30] Foreign Application Priority Data

Aug. 15, 1986 [JP] Japan ............................ 61-191212
Oct. 31, 1986 [JP] Japan ............................ 61-260430

[51] Int. Cl.⁴ .................................................. B23K 26/00
[52] U.S. Cl. ................................ 219/121.68; 219/121.74; 219/121.75; 219/121.84
[58] Field of Search .................. 219/121 LH, 121 LJ, 219/121 LP, 121 LQ, 121 LR, 121 FS, 121 LA, 121 LB, 121 L, 121 LM, 121 LG, 121 LN, 121 LK, 121 LL

[56] References Cited

U.S. PATENT DOCUMENTS

| | | | |
|---|---|---|---|
| 3,435,213 | 3/1969 | Colbow et al. | 219/121 LA X |
| 3,622,739 | 11/1971 | Steffen | 219/121 LR X |
| 3,749,878 | 7/1973 | Sullivan et al. | 219/121 LG |
| 4,200,382 | 4/1980 | Friedman | 219/121 LJ X |
| 4,322,600 | 3/1982 | Crahay | 219/121 LH X |
| 4,499,362 | 2/1985 | Martin | 219/121.61 |
| 4,568,815 | 2/1986 | Kimbara et al. | 219/121.7 |

FOREIGN PATENT DOCUMENTS 3331598 3/1984 Fed. Rep. of Germany .
224793 7/1985 Fed. Rep. of Germany .
2157540 10/1985 United Kingdom .

*Primary Examiner*—C. L. Albritton
*Attorney, Agent, or Firm*—Austin R. Miller

[57] ABSTRACT

A laser beam machining device employs a laser for generating a laser beam, a chopper device for intermittently blocking the laser beam for intermittently irradiating the laser beam onto the surface of a work, and an assisting gas discharge device for injecting assisting gas toward the point, on which the laser beam is irradiated. By locating the chopper upstream of the primary condenser and away from the assist gas flow, the assist gas to be discharged toward the predetermined point of the work, on which the laser beam is irradiated, is not disturbed which otherwise would cause turbulence to degrade the precision of the laser beam machining operation. In addition, the assisting gas discharging device is so arranged as to direct the assist gas flow substantially along the axis of the laser beam to be irradiated onto the work surface.

19 Claims, 3 Drawing Sheets

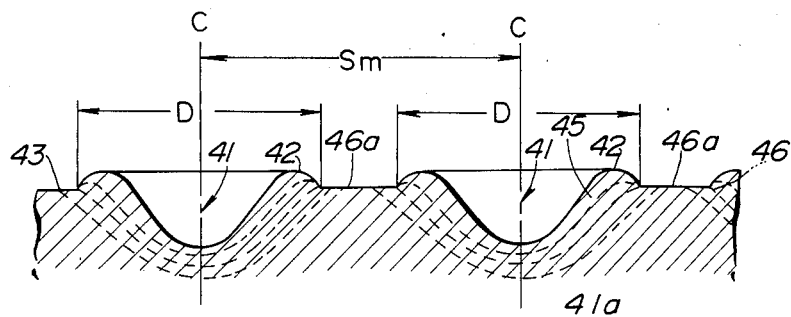
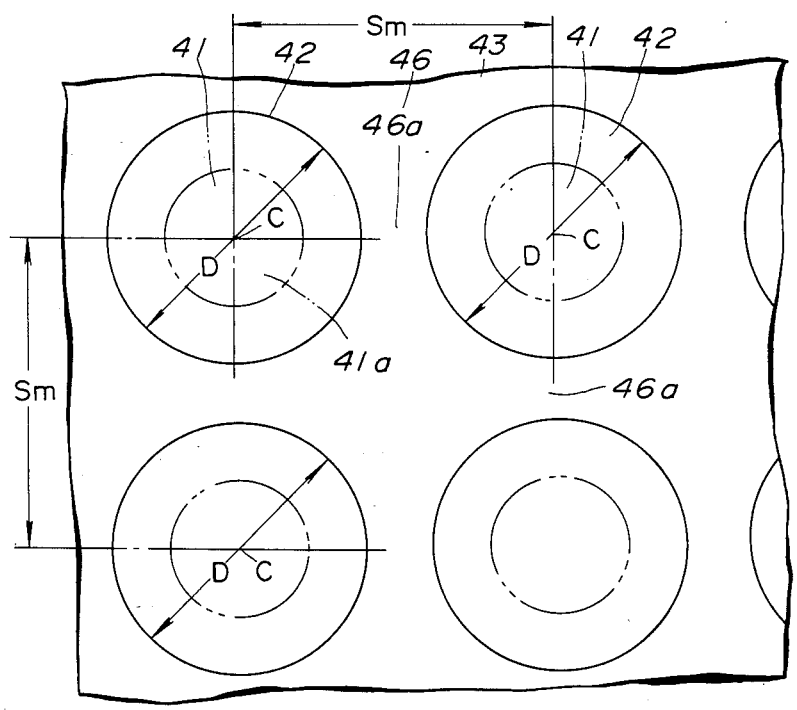

LASER BEAM MACHINING DEVICE

BACKGROUND OF THE INVENTION

1. Field of the Invention

The present invention relates generally to a device for performing a machining operation by means of a laser beam. More specifically, the invention relates to a laser beam machining device which can perform a precise machining operation, such as laser dulling operation for forming a predetermined pattern on uneveness with a desired roughness on a surface of a metal roll. Further particularly, the invention relates to a laser beam machining device which intermittently irradiates a laser beam onto a surface of a work object and discharges an assisting gas toward a point on the work to which the laser beam spot is irradiated.

2. Description of the Background Art

In the recent years, metal sheets, panels, plates which are beautifully painted, are widely used in various products. As a typical example of the painted metal sheet, the cold rolled thin steel sheet is usually produced by subjecting the cold rolled steel sheet to degreasing, annealing and temper rolling in order. In this case, the temper rolling is to be performed by means of work rolls having dulled surfaces. The work rolls having the dulled surfaces may form a proper or desired surface on the metal sheet surface for improving the galling resistance in the press forming operation.

When such metal plate, panel or sheet is used for a vehicular panel, particularly for a vehicular outer panel, the finish feeling after painting is a very important factor for evaluation of the vehicle per se since the external appearance of the vehicular body can directly appeal to the customer. There are various factors for determining the quality of the painted metal sheet, panel or plate. Among various factors, it is considered as particularly important to have a glossiness lessening irregular reflections on the painted surface and an image clarity defining few image strains. In general the combination of the glossiness and the image clarity is referred to as "distinctness of image".

It is known that the distinctness of image on the painted surface is determined depending upon the kind of paint and the painting process but is strongly influenced by the roughness of the surface of the material metal sheet, panel or plate. Hereafter, the word "metal sheet" is used for representing various forms of metal products, including metal strips, metal panels, metal plates and so forth. Namely, when the ratio of flat section occupied in the steel sheet surface is small and the uneveness section is relatively large, the ratio of flat section occupied in the painted surface becomes small and the uneveness becomes larger, and consequently the irregular reflection of light is caused to degrade the glossiness and the image clarity to lower image distinctness.

On the other hand, in order to form the metal sheet into a desired configuration, press forming may be performed for the metal sheet after the temper rolling operation. In this press forming, proper lubrication for reducing friction between press molding and the metal sheet is essential for making the press operation easy. In addition, the metal powder generated by friction between the molding and the metal sheet has to be trapped in order to avoid possibility of galling. In this view, the impressionformed on the metal sheet will effectively work for holding lubricant and for trapping metal powder.

Furthermore, in consideration of the smoothness of the painted surface, sufficient thickness of the paint layer is required for obtaining a satisfactory level of smoothness of the painted surface and image distinctness. If the metal sheet is too smooth, adherence of the paint onto the metal sheet surface is relativedly poor and limits the thickness of the paint layer which can be stably formed. In other words, by providing proper uneveness on the metal sheet surface, sufficiently high adherence of paint can be obtained to allow formation of a thicker paint layer. Therefore, in this view, it is preferable to provide a proper roughness on the metal sheet surface.

In general, the roughness of the metal sheet surface is represented by a center-line average roughness Ra. Further, it is well known that as the center-line average roughness Ra becomes larger, the magnitude of height difference between crest and concave portions becomes greater and hence the uneveness of the painted surface becomes greater to degrade image distinctness.

When the metal sheet is subjected to a temper rolling process with working roll dulled through the conventional shot blast process or discharge working process, it exhibits a rough surface composed of irregularly patterned uneven dulled sections, i.e. irregularly arranged crests and concave portions, as set forth above, wherein the flat section represents a very small proportion of the surface area. When painting is applied to such a metal sheet, the ratio of flat portion present in the painted area becomes small since the coating is generally formed along the surface configuration.

In order to improve over the problems in the prior art set forth above, there has been proposed a surface treatment process for the work roll by means of a laser beam. Such laser beam surface treatment processes for work roll have been disclosed in the Japanese Patent First (unexamined) Publication (Tokkai) No. Showa 56-160892, the Japanese Patent Second (examined) Publication (Tokko) No. Showa 58-25587, the Japanese Patent First Publication (Tokkai) No. Showa 54-61043, and the Japanese Patent First Publication (Tokkai) No. Showa 55-94790, for example. However, such prior proposed processes are not always successful to provide a satisfactory property for the work roll surface.

SUMMARY OF THE INVENTION

It is an object of the present invention to provide a laser beam machining device which can effectively and precisely perform a machining operation for a work surface.

Another object of the invention is to provide a laser beam machining device which is applicable for dulling a work roll for a temper rolling process.

In order to accomplish the aforementioned and other objects, a laser beam machining device, according to the invention, employs a laser for generating a laser beam, a chopper device for intermittently blocking the laser beam for intermittently irradiating the laser beam onto the surface of the work, and an assisting gas discharge device for projecting on assisting gas toward the point on which the laser beam is irradiated. The assisting gas discharging device is so arranged as to direct the assist gas flow substantially along the axis of the laser beam to be irradiated onto the work surface.

According to one aspect of the invention, the laser beam machining device comprises a laser beam source generating a laser beam, means for defining a laser beam path, a primary optical condenser disposed within the laser beam for condensing the laser beam to irradiate onto a predetermined point on the work, an assist gas discharge means for discharging an assist gas toward the predetermined point on the work, and a mechanical chopper having a rotary chopper disc disposed in the laser beam path and oriented upstream of the primary condenser for intermittently establishing and blocking the laser beam path so that the laser beam may be intermittently irradiated onto the predetermined point on the work.

In the preferred embodiment, the laser beam machining device further comprises an auxiliary condenser provided in the laser beam path upstream of the chopper, which auxiliary condenser has a focal distance approximately corresponding to the distance to the chopper disc. The laser beam machining device further comprises a diffuser provided in the laser beam path and downstream of the chopper, which diffuser passes a parallel beam to the primary condenser.

By locating the chopper upstream of the primary condenser and away from the assist gas flow, the assist gas discharged toward the predetermined point of the work on which the laser beam is irradiated, is not be disturbed by factors which otherwise cause turbulence to degrade the precision of the laser beam machining operation. In addition, by locating the chopper upstream of the primary condenser, the discharge means may discharge the assist gas substantially along an axis of the laser beam to be irradiated onto the predetermined point of the work. In order to do this, a torch is provided in the laser beam machining device, which torch has an end opposing the predetermined point of the work, the torch being formed with a through opening for passing the laser beam condensed by the primary condenser and the assist gas.

The primary condenser may comprise a condenser lens, the auxiliary condenser may comprise a condenser lens and the diffuser may comprise a diffuser lens. In the alternative, the primary condenser may comprise a condenser mirror, the auxiliary condenser may comprise a condenser mirror and the diffuser may comprise a diffuser mirror.

According to another aspect of the invention, an apparatus for making a work roll having a predetermined roughness of a regularly and geometrically patterned uneven surface for temper rolling of a metal sheet, comprises a support means for rotatably supporting a material roll, a drive means associated with teh support means for rotatingly driving the material roll at a given speed, a laser machining device for irradiating a laser beam on a predetermined position on the material roll so as to form an uneven section constituted of a depression and an annular projection surrounding the depression for dulling the surface of the work roll, the laser machining device including:

a laser beam source generating a laser beam;
means for defining a laser beam path;
an optical primary condenser disposed within the laser beam for condensing the laser beam to irradiate onto a predetermined point on work;
an assist gas discharge means for discharging an assist gas toward a predetermined point on the work; and
a mechanical chopper having a rotary chopper disc disposed in the laser beam path and oriented upstream of the optical condenser for intermittently establishing and blocking the laser beam path so that the laser beam may be intermittently irradiated onto the predetermined point on the work.

In the preferred construction, the laser beam machining device is adapted to generate a laser beam having an energy density in a range of $5 \times 10^4$ to $9 \times 10^6$ W/cm$^2$.

In order to form a regularly and geometrically patterned uneven surface, the apparatus also comprises a second driving means for causing relative displacement between the material roll and the laser beam machining device in an axial direction at a predetermined pitch.

The apparatus may be so designed as to form a work roll having a peripheral surface formed with a plurality of uneven sections in a spaced apart relationship to each other, each uneven section being constituted of a depression and an annular ring shaped projection surrounding the depression, the uneven sections being arranged to have a ratio between a center-to-center distance between adjacent uneven sections and the external size of the uneven section in a range of 0.85 to 1.7, and a difference between the center-to-center distance and the external size smaller than 280 $\mu$m.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 3 is an explanatory and enlarged section of the preferred embodiment of a work roll which has a dulled surface dulled by means of the first embodiment of the laser beam machining device according to the present invention;

FIG. 4 is an enlarged plan view of the work roll of FIG. 3; and

DESCRIPTION OF THE PREFERRED EMBODIMENT

In order to facilitate better understanding of the hereafter disclosed preferred embodiment of a laser beam machining device, reference is made to the co-pending U.S. patent applications Ser. Nos. 948,122 and 029,083, respectively filed on Dec. 31, 1986 and Mar. 23, 1987 and the co-pending U.S. patent application, entitled "WORK ROLL WITH DULLED SURFACE HAVING GEOMETRICALLY PATTERNED UNEVEN DULLED SECTIONS FOR TEMPER ROLLING AND PRODUCTION THEREOF", filed on July 13, 1987. The disclosures of the above-identified co-pending U.S. Pat. applciations are herein incorporated by reference for the sake of disclosure.

It should be appreciated that, through the preferred embodiments of the laser beam machining device according to the present invention will be discosed in detail in a form applied for the laser beam dulling system for work rolls for temper rolling, application of the preferred embodiments of the laser beam machining device according to the invention is not specific to the disclosed system but can extend in various fields which require laser beam machining operations.

Figure 1:
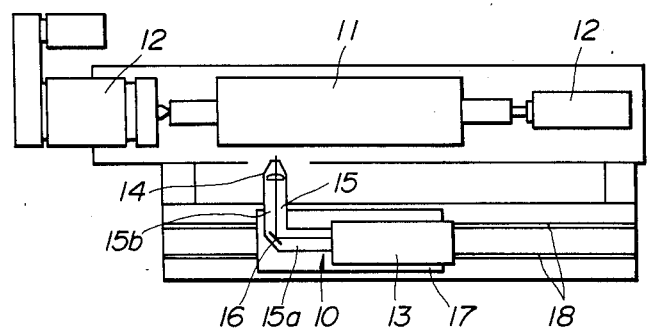
FIG. 1 is a fragmentary and general illustration of a laser beam dulling system for dulling a work roll for temper rolling, to which the preferred embodiment of a laser beam machining device, according to the present invention is applicable.

Referring now to the drawings, particularly to FIG. 1, there is illustrated a dulling apparatus for a work roll for forming regularly and geometrically patterned unevenness on the surface. As shown in FIG. 1, the work roll dulling apparatus generally has an equivalent construction to a lathe, grinder or so forth. The apparatus includes a roll support 12 for rotatably supporting the material roll 11. The roll support 12 is operable to rotatingly drive the material roll 11 at a predetermined rotation speed.

A laser beam machining device 10 includes a laser beam generator 13, a laser head 14 connected to the laser beam generator via a beam path 15. As seen, the beam path 15 is bent at the intermediate portion thereof. A deflector mirror 16 is provided at the bent corner for deflecting the laser beam from the laser beam generator 13 towrd the laser head 14. In the shown example, the beam path 15 is bent at right angle by arranging the axis of the section 15b lying perpendicular to the axis of the section 15a of the beam path 15. Therefore, the deflector mirror 16 is positioned at an angle of 45° relative of the axes of the sections 15a and 15b.

In the preferred construction, the laser beam machining device is adapted to generate a laser beam having energy density in a range of $5 \times 10^4$ to $9 \times 10^6$ W/cm$^2$.

The laser beam machining device 10 is mounted on a movable base 17. The movable base 16 is movable along guide rails 18 which extend parallel to the axis of the material roll 11. The laser head 14 opposes the outer periphery of the material roll and is focused onto a predetermined spot on the roller periphery.

The pitch of the uneven dulled sections determining the roughness of the roll surface can be adjusted by adjusting the drive speed of the roll support 12 and the movable base 17 along the guide rails 18. The depth of the uneven dulled sections can be thus controlled by adjusting the rotation speed of the chopper which defines the irradiation period of the laser beam.

Though it is not clearly shown in FIG. 1, an assist gas, such as oxygen gas, is discharged toward the point on the material roll 11 to which the laser beam is irradiated via an assist gas nozzle.

Figure 2:
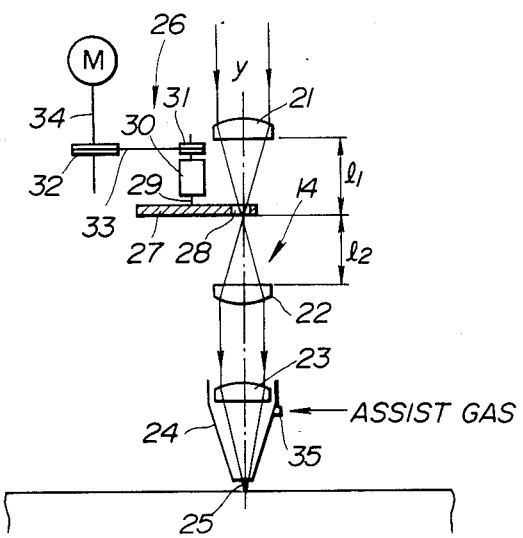
FIG. 2 is a fragmentary section of the first embodiment of a laser beam machining device according to the invention.

FIG. 2 shows the preferred construction of the laser head 14 in the first embodiment of the laser beam machining device according to the invention. The laser head 14 comprises a condenser lens 21 which has a focal distance $l_1$, a diffuser lens 22 which has a focal distance $l_2$ and a condenser lens 23 disposed within a torch 24. The torch 24 is formed with an opening 25 through which the laser beam as condensed by the condenser lens 23 is irradiated onto the outer periphery of the material roll 11.

The condenser lens 21 and the diffuser lens 22 are arranged in alignment with each other with respect to the laser beam axis y and distanced at $l_1 + l_2$. Therefore, the laser beam is condensed by the condenser lens 21 and then converted into a parallel beam by means of the diffuser lens 22. The parallel beam from the diffuser lens 22 is again condensed by the condenser lens 23 in the torch 24. As will be appreciated, the condenser lens 23 is also aligned with the condenser lens 21 and the diffuser lens 22 with respect to the laser beam axis y. The condensed laser beam is then irradiated onto the predetermined point on the outer periphery of the material roll.

A chopper mechanism 26 is provided for intermittenly establishing and blocking the laser beam path between the condenser lens 21 and the diffuser lens 22. The chopper mechanism 26 employed in the shown embodiment is a mechanical chopper comprising a chopper disc 27 formed with a plurality of circumferentially aligned through openings or slits 28. The slits 28 are arranged at regular intervals. The interval may be determined according to the desired roughness on the roll perihery. The chopper disc 27 is secured onto one end of a rotary shaft 29 which is rotatably supported by means of a bearing assembly 30. Adjacent the other end of the rotary shaft 29, a driven pulley 31 is secured for rotation therewith. The driven pulley 31 is drivingly connected to a drive pulley 32 by means of a drive belt 33. The drive pulley 32 is secured onto a drive shaft 34 of a drive motor M. The motor M thus drives the chopper disc 27 at a given speed for intermittently establishing and blocking the laser beam path.

As seen from FIG. 2, the chopper disc 27 is so oriented as to position the circumferential edge portion within the laser beam path between the condenser lens 21 and the diffuser lens 22. In the preferred construction, the chopper disc 27 is located around the focal point of the condenser lens 21 to establish and block the the laser beam path thereat.

An assist gas inlet 35 is formed in the torch 24 for introducing the assist gas therethrough. The assist gas introduced into the torch 24 is discharged toward the section of the roll periphery where the laser beam is irradiated, via the opening 25. Therefore, the assist gas is discharged substantially along the axis of the laser beam to be irradiated onto the roll periphery.

In operation, the laser beam generated by the laser beam generator 13 is transmitted through the beam path 15 and received by the condenser lens 21. The condenser lens 21 passes the laser beam to the diffuser lens 22. The laser beam passing through the condenser lens 21 is condensed the laser beam to the focal point of the condenser lens. Since the chopper disc 27 moves across the laser beam path between the condenser lens 21 and the diffuser lens 22, as set forth above, the laser beam is passed to the diffuser lens 22 while the one of the slits 28 is placed in the laser beam path.

The diffuser lens 22 receives the condensed laser beam and converts the condensed laser beam to a parallel beam. This parallel beam is received by the condenser lens 23 in the torch 24. The condenser lens 23 focuses the laser beam on the point of the outer periphery of the material roll 11. Since the chopper disc 27 intermittently establishes and blocks the laser beam path between the condenser lens 21 and the diffuser lens 22, the laser beam is intermittently irradiated onto the periphery of the work roll.

During this operation, the assist gas, such as O$_2$ gas, is discharged toward the point on which the laser beam is irradiated. This assist gas assists for fusing the metal on which the laser beam energy is exerted and adhering the blow-off metal vapor to the circumference of the blown-out section.

FIGS. 3 and 4 show the roll surface dulled by means of the laser beam machining device set forth above.

The apparatus may be so designed as to form a work roll having a peripheral surface formed with a plurality of uneven sections in a spaced apart relationship to eachother, each uneven section being constituted of a depression and an annular ring shaped projection surrounding the depression, the uneven sections being arranged to have a ratio between the center-to-center distance between adjacent uineven sections and the external size of an uneven section in a range of 0.85 to 1.7, and said uneven sections having a difference between the center-to-center distance and the external size smaller than 280 μm.

The laser beams condensed through the laser head 14 as set forth above, is irradiated onto the surface of the rotating material work roll in sequence to regularly fuse surface portions of the roll exposed to the laser energy, whereby a plurality of crater-like uneven dulled sections 41 are formed on the surface 43 of the work roll in regularly and geometrically patterned fashion. As shown in FIGS. 3 and 4, each uneven dulled section has a concave portion 41a. The fused metal base of the work roll upheaves upwardly from the surface level 46 of the work roll in the form of a ring surrounding the associated concave portion 41. The upheaved portion will be hereafter referred to as "annular crest" or "crest ring" throughout the disclosure and the annular crest is generally represented by the reference numeral 42. On the other hand, during irradiation of the laser beam in formation of respective crater-like uneven dulled sections 41, the metal is molten by the energy of the laser beam for form a heat-influenced layer 45 along the inner periphery of the concave portion 41a.

As shown in FIG. 3 and 4, the shown embodiment, in which the centers C of respective uneven dulled sections 41 are aligned longitudinally and circumferentially with regular intervals Sm relative to adjacent uneven dulled sections of the work roll 43 is formed with the uneven dulled sections 1 with the concave portion 1a and the annular crest 42 in an arrangement, in which the crater-like uneven dulled sections 41 are longitudinally and circumferentially aligned with the adjacent uneven dulled sections with predetermined and regular center-to-center intervals Sm relative to the adjacent uneven dulled sections. The diameters of the concave portion 1 and the annular crest 42 as well as the depth of the concave portion 1a are determined by the intensity and density of the laser beam irradiated onto the surface of the work roll 43. In the shown embodiment, the outer diameter D of the annular crest 42, which represents the outer extreme of the uneven dulled section, is selected in relation to the aforementioned center-to-center interval Sm, so that a surface level flat section 46a can be left between adjacent uneven dulled sections 41. The aforementioned uneven dulled sections 41 are regularly formed by regularly irradiating the laser beam while rotating or axially shifting the work roll, wherein the surface of the roll is rendered into a rough state through the creation of these formed uneven dulled sections. The rough state of the roll surface is shown in FIGS. 3 and 4. The intervals between the uneven dulled sections 41 can be adjusted by controlling the frequency of irradiation of the laser beam in relation to the rotating speed of the work roll in the rotating direction of the work roll and by controlling the pitch of axially shifting of the irradiation point of the laser beam.

As set forth, the depth and the diameter of the uneven dulled section, which diameter is defined by the outer diameter of the annular crest 42, are determined by the intensity of the incident laser beam and the irradiation time.

The base metal of the roll heated by the laser beam instantly changes into a metallic vapor due to great energy density of the irradiated laser beam. In this case, the fused metal is blown away from the roll surface by the generated vapor pressure to form the concave portion 41a. On the other hand, the blown fused metal again adheres to the circumference of the concave portion to form the annular crest 42 surrounding the concave portion. Such series of action are more efficiently performed by blowing an auxiliary gas, such as oxygen gas or the like to the reacting point.

Figure 5:
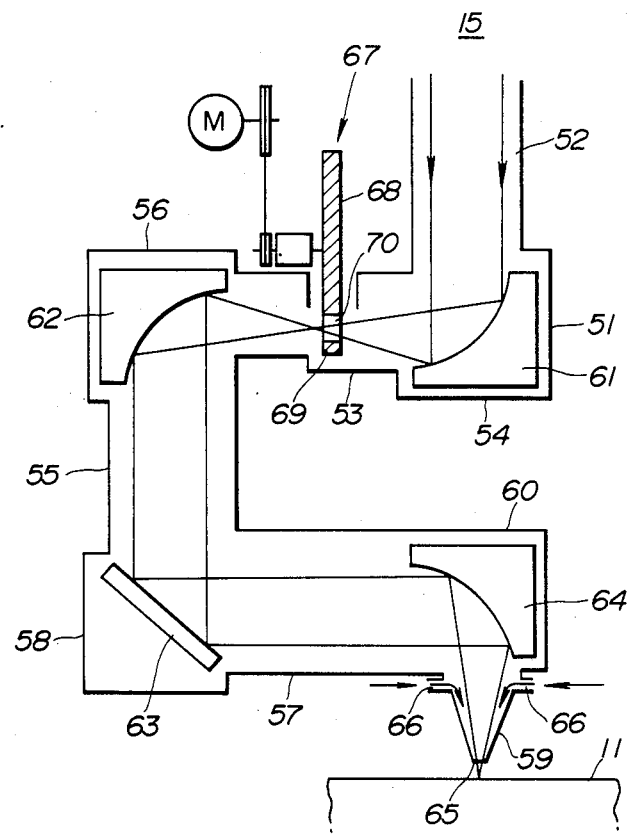
FIG. 5 is a fragmentary section of a second embodiment of a laser beam machining device according to the invention.

FIG. 5 shows the laser head constituting a major part of the second embodiment of the laser beam machining device according to the invention.

In this embodiment of FIG. 5, a bent laser beam path is defined by a laser head casing 51. Namely, the laser head casing 51 has a first section 52 aligned with the beam path 15, a second section 53 connected to the first section through a bent corner 54 and having an axis extending substantially perpendicular to the axis of the first section, a third section 55 connected to the second section through a bent corner 56 and having an axis extending substantially perpendicular to the axis of the second section, a fourth section 57 connected to the third section through a bent corner 58 and having an axis extending substantially perpendicular to the axis of the third section, and a torch section 59 connected to the fourth section via a bent corner 60

A condenser mirror 61 is provided at the first corner 54 for condensingly deflecting the laser beam fed along the first section 52 to the direction of the second section 53. The condensed laser beam from the condenser mirror 60 is irradiated on a diffuser mirror 62 provided at the second corner 56. The diffuser mirror 62 forms a parallel beam to be fed along the third section 55. This parallel beam is reflected by a plane mirror 63 provided at the third corner 58 and irradiated onto a condenser mirror 64 provided at the fourth corner. This condenser mirror 64 causes condensation of the parallel beam of teh laser energy upon the peripheral surface of the material roll 11 via a through opening 65 formed through the end of the torch section 59.

Similarly to the foregoing first embodiment, assist gas inlets 66 are formed in the torch section 59 for introducing the assist gas therein and for being discharged through the opening 65.

A chopper mechanism 67 having the chopper disc 68 has substantially the identical construction as that disclosed with respect to the first embodiment. The chopper disc 68 is so arranged as to place the peripheral edge portion 69 in the laser beam path between the condenser mirror 61 and the diffuser mirror 62 at approximately the focal point of the condenser mirror. Likewise to the foregoing embodiment, a plurality of slits 70 are formed in the section of the chopper disc to be located in the laser beam path.

As will be appreciated, in this second embodiment, substantially same laser beam machining operation as that discussed with respect to the first embodiment can be performed.

According to the present invention, since the chopper device is positioned away from the assist gas flow path, the air flow generated by rotation of the chopper disc will not influence the assist gas flow. This prevents teh assist gas flow from being disturbed which otherwise influences the precise formation of the desired configuration of the concaves and crests.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A laser beam machining device comprising:
a laser beam source generating a laser beam;
means for defining a laser beam path;
an optical primary condenser disposed within the laser beam for condensing the laser beam to irradiate onto a predetermined point on a work object;
an assist gas discharge means for discharging an assist gas toward said predetermined point on the work object;
a mechanical chopper having a rotary chopper disc disposed in said laser beam path and oriented upstream of said optical condenser for intermittently establishing and blocking said laser beam path so that the laser beam may be intermittently irradiated onto the predetermined point on said work object;
an auxiliary condenser provided in said laser beam path upstream of said chopper, which auxiliary condenser has a focal distance approximately corresponding to the distance to said chopper disc,
a diffuser provided in said laser beam path and downstream of said chopper, which diffuser passes a parallel beam to said primary condenser; and
wherein said primary condenser comprises a condenser mirror.

2. A laser beam machining device as set forth in claim 1, wherein said assist gas discharge means discharges said assist gas substantially along an axis of the laser beam to be irradiated onto said predetermined point of the work.

3. A laser beam machining device as set forth in claim 4, which further comprises a torch having an end opposing said predetermined point of the work, said torch being formed with a through opening for passing said laser beam condensed by said primary condenser and said assist gas.

4. A laser beam machining device as set forth in claim 1, wherein said primary condenser comprises a condenser lens.

5. A laser beam machining device as set forth in claim 1, wherein said auxiliary condenser comprises a condenser lens.

6. A laser beam machining device as set forth in claim 1, wherein said diffuser comprises a diffuser lens.

7. A laser beam machining device as set forth in claim 1, wherein said primary condenser comprises a condenser lens, said auxiliary condenser comprises a condenser lens and said diffuser comprises a diffuser lens.

8. A laser beam machining device as set forth in claim 1, wherein said auxiliary condenser comprises a condenser mirror.

9. A laser beam machining device as set forth in claim 1, wherien said diffuser comprises a diffuser mirror.

10. A laser beam machining device as set forth in claim 1, wherein said primary condenser comprises a condenser mirror, said auxiliary condenser comprises a condenser mirror and said diffuser comprises a diffuser mirror.

11. An apparatus for making a work roll having a predetermined roughness and a regularly and geometrically patterned uneven surface for temper rolling of a metal sheet, comprising:
a support means for rotatably supporting a material roll;
a drive means associated with said support means for rotatingly driving said material roll at a given speed;
a laser machining device for irradiating a laser beam on a predetermined position on said material roll so as to form uneven sections constituted of a depression and an annular projection surrounding said depression for dulling the surface of said work roll, said laser machining device including:
a laser beam source generating a laser beam;
means for defining a laser beam path;
an optical primary condenser disposed within the laser beam for condensing the laser beam to irradiate onto a predetermined point on said work roll;
an assist gas discharge means for discharging an assist gas toward said predetermined point on the work roll;
a mechanical chopper having a rotary chopper disc disposed in said laser beam path and oriented upstream of said optical condenser for intermittently establishing and blocking said laser beam path so that the laser beam may be intermittently irradiated onto the predetermined point on said work,
an auxiliary condenser provided in said laser beam path upstream of said chopper, which auxiliary condenser has a focal distance approximately corresponding to the distance to said chopper disc, and
a diffuser provided in said laser beam path and downstream of said chopper, which diffuser passes a parallel beam to said primary condenser.

12. An apparatus as set forth in claim 11, wherein said assist gas discharge means discharges said assist gas substantially along an axis of the laser beam to be irradiated onto said predetermined point of the work.

13. An apparatus as set forth in claim 12, wherein said laser beam machining device further comprises a torch having an end opposing said predetermined point of the work, said torch being formed with a through opening for passing said laser beam condensed by said primary condenser and said assist gas.

14. An apparatus as set forth in claim 11, wherein said primary condenser comprises a condenser lens, said auxiliary condenser comprises a condenser lens and said diffuser comprises a diffuser lens.

15. An apparatus as set forth in claim 11, wherein said primary condenser comprises a condenser mirror, said auxiliary condenser comprises a condenser mirror and said diffuser comprises a diffuser mirror.

16. An apparatus as set forth in claim 11, wherein said laser beam machining device is adapted to generate said laser beam having energy density in a range of $5 \times 10^4$ to $9 \times 10^6$ W/cm$^2$.

17. An apparatus as set forth in claim 11, which further comprises a second driving means for causing relative displacement between sid material roll and said laser system in axisl direction at a predetermined pitch.

18. An apparatus as set forth in claim 11, which is so designed as to form a work roll having a peripheral surface formed with a plurality of uneven sections in a spaced apart relationship to each other, each uneven section being constituted of a depression and an annular ring shaped projection surrounding said depression, said uneven sections being arranged to have a ratio between a center-to-center distance between adjacent uneven sections and the external size of an uneven section in the range of 0.85 to 1.7, and said uneven sections having a difference between the center-to-center distance and the external size smaller than 280 m.

19. A laser beam machining device comprising:
a laser beam source generating a laser beam;
means for defining a laser beam path;
an optical primary condenser disposed within the laser beam for condensing the laser beam to irradiate onto a predetermined point on a work object;
an assist gas discharge means of discharging an assist gas toward said predetermined point on the work object;
a mechanical chopper having a rotary chopper disc disposed in said laser beam path and oriented upstream of said optical condenser for intermittently establishing and blocking said laser beam path so that the laser beam may be intermittently irradiated onto the predetermined point on said work object; and
an auxiliary condenser provided in said laser beam path upstream of said chopper, which auxiliary condenser has a focal distance approximately corresponding to the distance to said chopper disc.

* * * * *